(12) United States Patent
O'Neill et al.

(10) Patent No.: US 9,066,292 B2
(45) Date of Patent: Jun. 23, 2015

(54) SYSTEM AND METHOD FOR POLLING A NETWORK SERVICE

(75) Inventors: Conor Michael O'Neill, Waterloo (CA); Daryl Joseph Martin, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 200 days.

(21) Appl. No.: 13/464,312

(22) Filed: May 4, 2012

(65) Prior Publication Data

US 2013/0295848 A1 Nov. 7, 2013

(51) Int. Cl.
| | |
|---|---|
| H04B 7/00 | (2006.01) |
| H04W 84/00 | (2009.01) |
| H04W 52/02 | (2009.01) |
| H04W 68/00 | (2009.01) |

(52) U.S. Cl.
CPC .......... *H04W 52/0216* (2013.01); *H04W 68/00* (2013.01)

(58) Field of Classification Search
CPC . H04L 12/5692; H04W 88/04; H04W 88/182
See application file for complete search history.

(56) References Cited

U.S. PATENT DOCUMENTS

| | | | |
|---|---|---|---|
| 7,925,212 B2 | 4/2011 | Eisenbach | |
| 8,249,505 B1* | 8/2012 | Goldner et al. | 455/41.2 |
| 2003/0195019 A1* | 10/2003 | Litwin | 455/574 |
| 2004/0205105 A1* | 10/2004 | Larsson et al. | 709/200 |
| 2005/0086273 A1* | 4/2005 | Loebbert et al. | 707/204 |
| 2005/0239497 A1* | 10/2005 | Bahl et al. | 455/552.1 |
| 2006/0087993 A1 | 4/2006 | Sengupta et al. | |
| 2007/0168471 A1* | 7/2007 | Childress et al. | 709/220 |
| 2008/0102793 A1 | 5/2008 | Ananthanarayanan et al. | |
| 2009/0325622 A1 | 12/2009 | Matsumura et al. | |
| 2010/0203905 A1 | 8/2010 | Chaubey et al. | |
| 2010/0272083 A1* | 10/2010 | Itoh et al. | 370/338 |
| 2011/0255444 A1* | 10/2011 | Soliman et al. | 370/255 |
| 2011/0268000 A1* | 11/2011 | Kashikar et al. | 370/311 |
| 2011/0319072 A1 | 12/2011 | Ekici et al. | |
| 2012/0163260 A1* | 6/2012 | Yeo | 370/311 |
| 2012/0206557 A1* | 8/2012 | Ridges et al. | 348/14.02 |
| 2013/0040697 A1 | 2/2013 | Ekici et al. | |
| 2013/0196651 A1 | 8/2013 | Ekici et al. | |

OTHER PUBLICATIONS

Agreda Labrador, A.; Search Report from corresponding European Application No. 12166819.8; search completed Oct. 4, 2012.

* cited by examiner

*Primary Examiner* — Andrew Wendell
*Assistant Examiner* — Cindy Trandai
(74) *Attorney, Agent, or Firm* — Fleit Gibbons Gutman Bongini & Bianco P.L.

(57) ABSTRACT

A method of operating a mobile device is provided, the method comprising: pairing the mobile device with a second device; having the second device poll a network service on behalf of the mobile device; and obtaining data provided by the network service. A method of operating on behalf of a mobile device is also provided, the method comprising: pairing a second device with the mobile device; polling a network service on behalf of the mobile device; and enabling data provided by the network service to be sent to the mobile device.

19 Claims, 10 Drawing Sheets

SYSTEM AND METHOD FOR POLLING A NETWORK SERVICE

TECHNICAL FIELD

The following relates to systems and methods for polling a network service.

DESCRIPTION OF THE RELATED ART

Mobile electronic device such as smart phones, tablet computers, and the like, often have the ability to operate in a low power mode to reduce battery drain. This low power mode may include de-activating a radio used for connecting to a mobile network.

When configured to connect to a mobile network such as a Universal Mobile Telecommunications System (UMTS) network, the mobile device may need to periodically "wake-up" and poll the mobile network to determine if there exists a notification of an incoming call or other data being pushed to the mobile device. This waking up typically requires the mobile device to leave its low power mode and to activate a radio, which can have an adverse impact on battery life, contrary to the purpose of having the low power mode.

BRIEF DESCRIPTION OF THE DRAWINGS

Embodiments will now be described by way of example only with reference to the appended drawings wherein.

DETAILED DESCRIPTION

Figure 1:
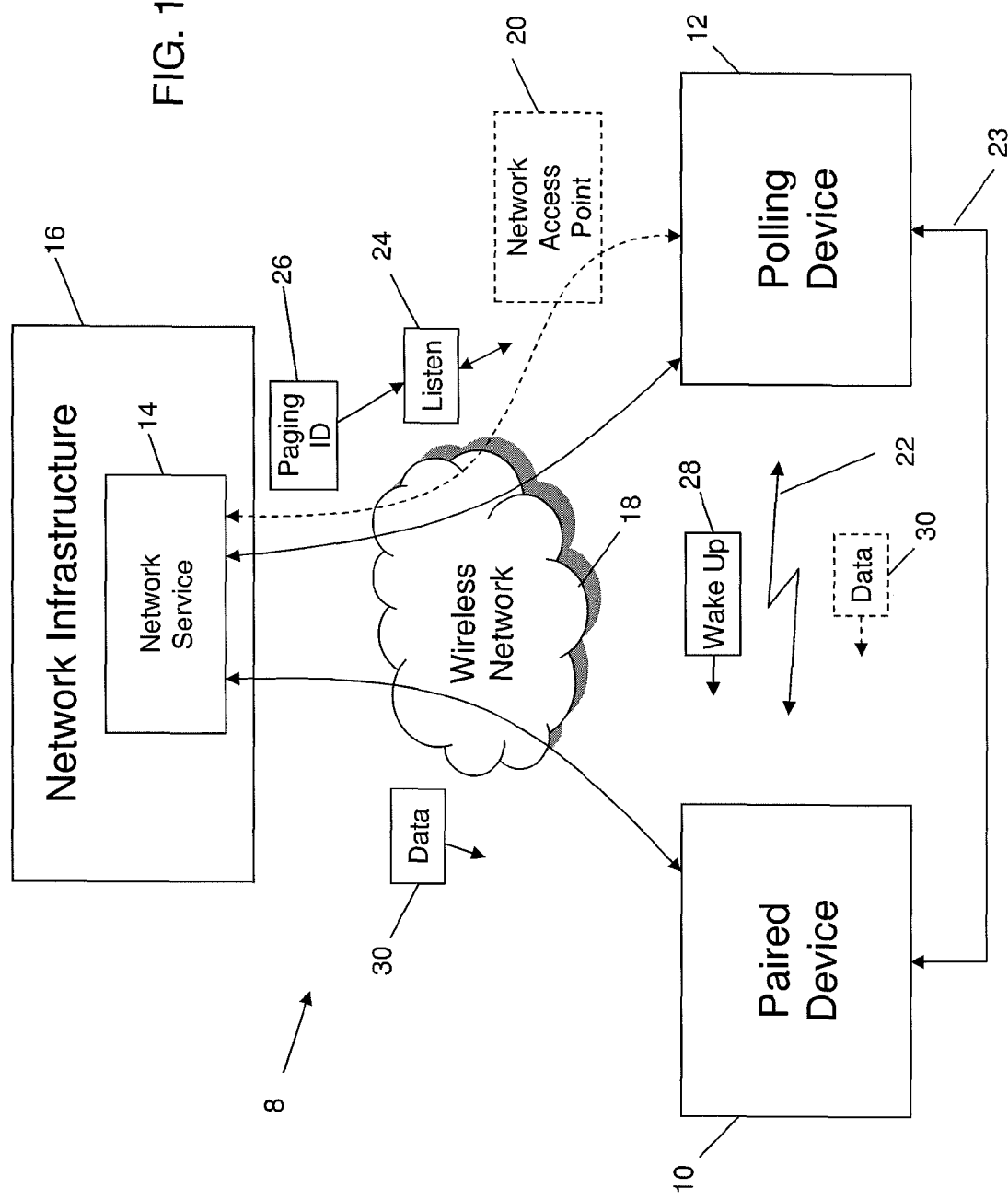
FIG. 1 is a block diagram of an example communication system.

It will be appreciated that for simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

To maximize the amount of time that a mobile device utilizes a low power state, while at the same time enabling the mobile device to be aware of incoming data from a network, a pairing with another device may be used to have the other device poll a network service on behalf of the mobile device. In this way, a device having a larger battery or otherwise more battery capacity can act on behalf of another device having a relatively smaller battery or lower battery capacity to poll a network and minimize exiting from a low power state. In the examples discussed below, the principles may be applied to any pair of electronic devices, in particular paired mobile devices. For illustrative purposes, a device in the pairing that polls a network and/or network service on behalf of another device will be referred to as a "polling device," and the device which is paired to the polling device will be referred to as a "paired device."

Turning now to FIG. 1, an example of a communication system 8 is shown. In this example, the communication system 8 enables either or both a paired device 10 and a polling device 12 to access a network service 14 provided or hosted by or within a network infrastructure 16, via a wireless network 18. It can be appreciated that the polling device 12 may access the wireless network 18 directly (e.g., via a cellular radio), or using a network access point 20 such as a Wi-Fi hotspot, as shown in dashed lines in FIG. 1. It can be appreciated that, although not explicitly shown in FIG. 1, the paired device 10 may also be operable to access the network 18 via a network access point 20. It can also be appreciated that the polling device 12 may also access the network service 14 used by the paired device 10, via another network (not shown) such as the Internet. In other words, the polling device 12 may not require a connection to the wireless network 18 in order to poll the network service 14 on behalf of the paired device 10.

The paired device 10 may be tethered to or otherwise paired with or communicably connectable to the polling device 12 via a wireless short-range communication connection 22, e.g., Bluetooth, Wi-Fi, infrared, etc. The paired device 10 may also be tethered to or otherwise paired with or communicably connectable to the polling device 12 via a wired connection, such as a Universal Serial Bus (USB), Ethernet, other wired communication links, etc. The polling device 12 is operable to activate a receiver to listen 24 for what the network service 14 is broadcasting, to enable the polling device 12 to determine if there is a need for further communication with the network service 14, e.g., to determine if data 30 is about to be, or is waiting to be, pushed or otherwise provided to the paired device 10. If such data 30 is pending for the paired device 10, the network service 14 (or other component of the network infrastructure 16) broadcasts a paging indicator (ID) 26, which indicates whether a corresponding device has a page pending. The paging ID 26 for a particular device may be derived from a unique identifier associated with that device. For example, a cellular phone or smart phone typically has a unique identifier embedded in a network subscription module of the phone, e.g., a Subscriber Identity Module (SIM) for Global System for Mobile Communication (GSM) networks, or embedded in the device itself for Code Division Multiple Access (CDMA) networks.

The polling device 12 may be operable to listen 24 for a paging ID 26 from the network service 14 to determine if, for example, a voice communication or messaging being pushed to the paired device 10 is pending for the paired device 10. By having the polling device 12 listen 24 for the paging ID 26, the paired device 10 does not need to exit from a low power state, such as a sleep mode, in order to determine if data 30 is pending. In this way, the network service 14 can be polled or "paged" by the polling device 12, on behalf of the paired device 10 on a periodic basis, without disrupting the low power mode being utilized by the paired device 10. If a paging ID 26 is discovered indicating the presence of pending data 30 for the paired device 10, the polling device 12 may send a wake up message 28 to the paired device 10 to enable the paired device 10 to exit the low power mode or "wake-up" and access the network service 14 to obtain the data 30.

Alternatively, the polling device 12 may obtain the data 30 from the network service 14 on behalf of the paired device 10 and send such data to the paired device 10 over the short range communications connection 22. This scenario allows the polling device 12 to not only maximize the time that the paired device 10 can utilize the low power mode, but also enable the polling device 12 to offload bandwidth and processing burden from the paired device 10, in particular where the polling device 12 has access to a lower cost access point such as the network access point 20. This offloading may allow the polling device 12 to obtain data for the paired device 10 to avoid the paired device 10 from incurring charges associated with accessing the wireless network 18, if applicable. Similarly, having the polling device 12 obtain the data 30 on behalf of the paired device 10 enables the paired device 10 to obtain the data over a lower power medium. Furthermore, since periodic polling may often result in confirming the absence of data 30, having the polling device 12 act on behalf of the paired device 10 avoids the paired device 10 having to periodically wake up only to discover such an absence of data 30 and then returning to the low power state. It can be appreciated that the polling device 12 may also listen 24 to the network service 14 with respect to its own services.

Figure 2:
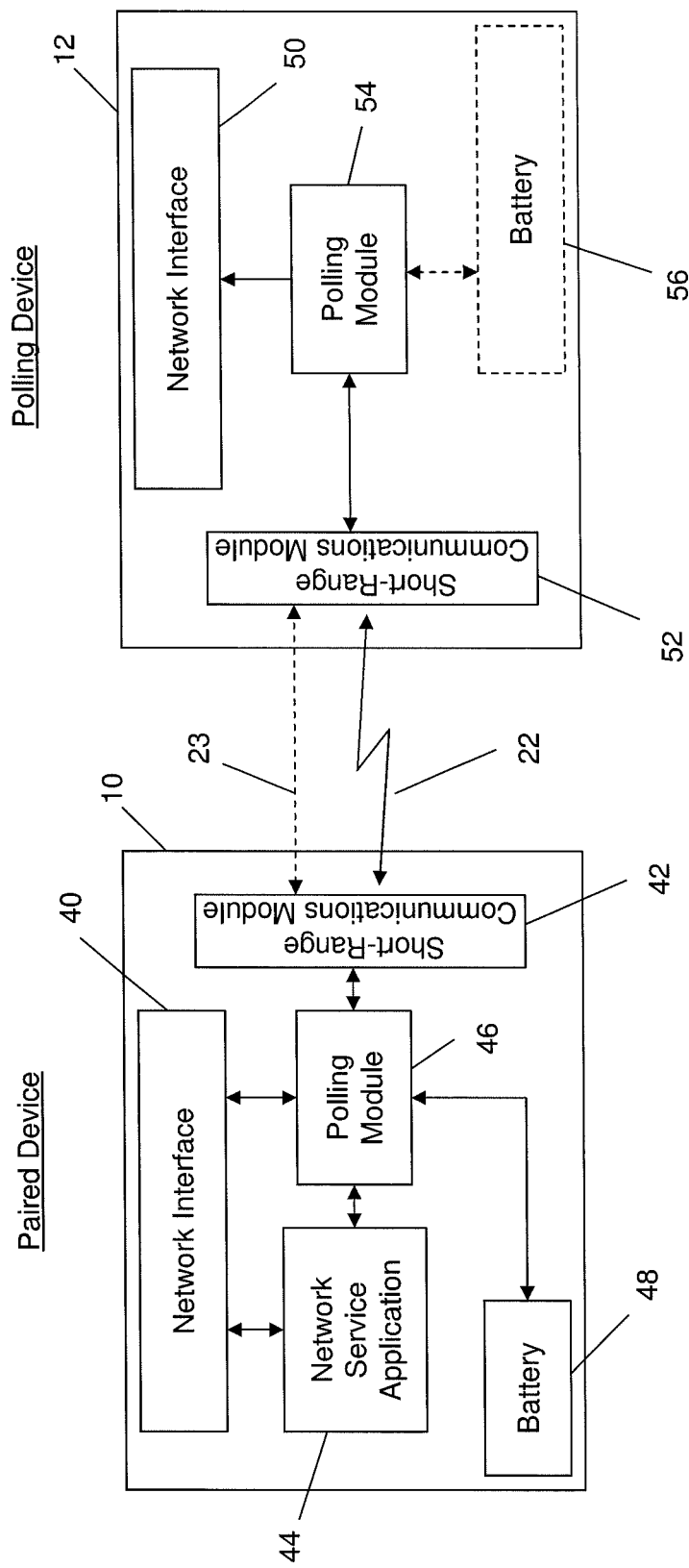
FIG. 2 is a block diagram of example paired and polling devices.

Referring to FIG. 2, example configurations for the paired device 10 and polling device 12 are shown. The paired device 10 in the example shown includes a network interface 40 to enable the paired device 10 to access the network service 14 via the wireless network 18. For example, the network interface 40 may include any one or more of a cellular radio, a Wi-Fi radio, etc. The paired device 10 also includes a short-range communications module 42 for communicating with a corresponding short-range communications module 52 of the polling device 12, over the wireless short-range connection 22 or a wired connection 23. For example, the short-range communications module 42 may be operable to communicate wirelessly with the short-range communications module 52 (e.g., via Bluetooth, Wi-Fi, etc.), or via the wired connection 23 (e.g., USB, Ethernet, etc.). For ease of reference, the following examples will illustrate the principles herein described assuming a wireless short-range connection 22 between the paired device 10 and the polling device 12, however, it will be appreciated that such principles equally apply to wired connections 23 such as a USB tethered connection (e.g., between a smart phone and a personal computer).

The paired device 10 also includes a network service application 44, which may represent any application, component, or service on the paired device 10 that requires access to the network service 14 being polled. A polling module 46 is also provided on the paired device 10 for initiating a pairing with the polling device 12 in order to have the polling device 12 poll the network service 14 on behalf of the paired device 10. The polling module 46 may act on an instruction from or for the network service application 44 and in this example has access to parameters associated with a battery 48 used by the paired device 10.

The polling module 46 may also act independently of the network service application 44 whereupon detecting a low power state, the polling module 46 may initiate having the polling device 12 poll the network service 14 for the network service application 44. For example, upon detecting that the paired device 10 has entered a low power state, the polling module 46 may begin having the polling device 12 obtain presence updates from a presence server for an instant messaging (IM) application. Similarly, upon detecting the low power state, the polling module 46 may have the polling device 12 determine when an incoming call is expected via a voice service. It can be appreciated that although only one network service application 44 is shown in FIG. 2, the polling module 46 may operate on behalf of a plurality of network service applications 44.

The polling device 12 also includes a network interface 50. The network interface 50 of the polling device 12 may be similar to that used by the paired device 10, e.g., if the polling device 12 is also a wirelessly-enabled device, or may include other network connection capabilities, such as an ability to access the network service 14 via the Internet or another network other than the wireless network 18. The polling device 12 also includes a polling module 54 for communicating with the polling module 46 of the paired device 10 in order to detect when to poll the network service 14 on behalf of one or more network service applications 44 on the paired device 10. The polling device 12, in some examples, may also include a battery 56, e.g., where the polling device 12 is also a wireless or mobile device. The polling device 12 shown in FIG. 2 is purely for illustrative purposes and, in some examples, may have the same configuration as the paired device 10, e.g., when both the paired device 10 and the polling device 12 are the same type of device, e.g., smart phones, or otherwise have similar capabilities, e.g., tethered devices such as smart phones and tablet computers or other electronic devices.

Figure 3:
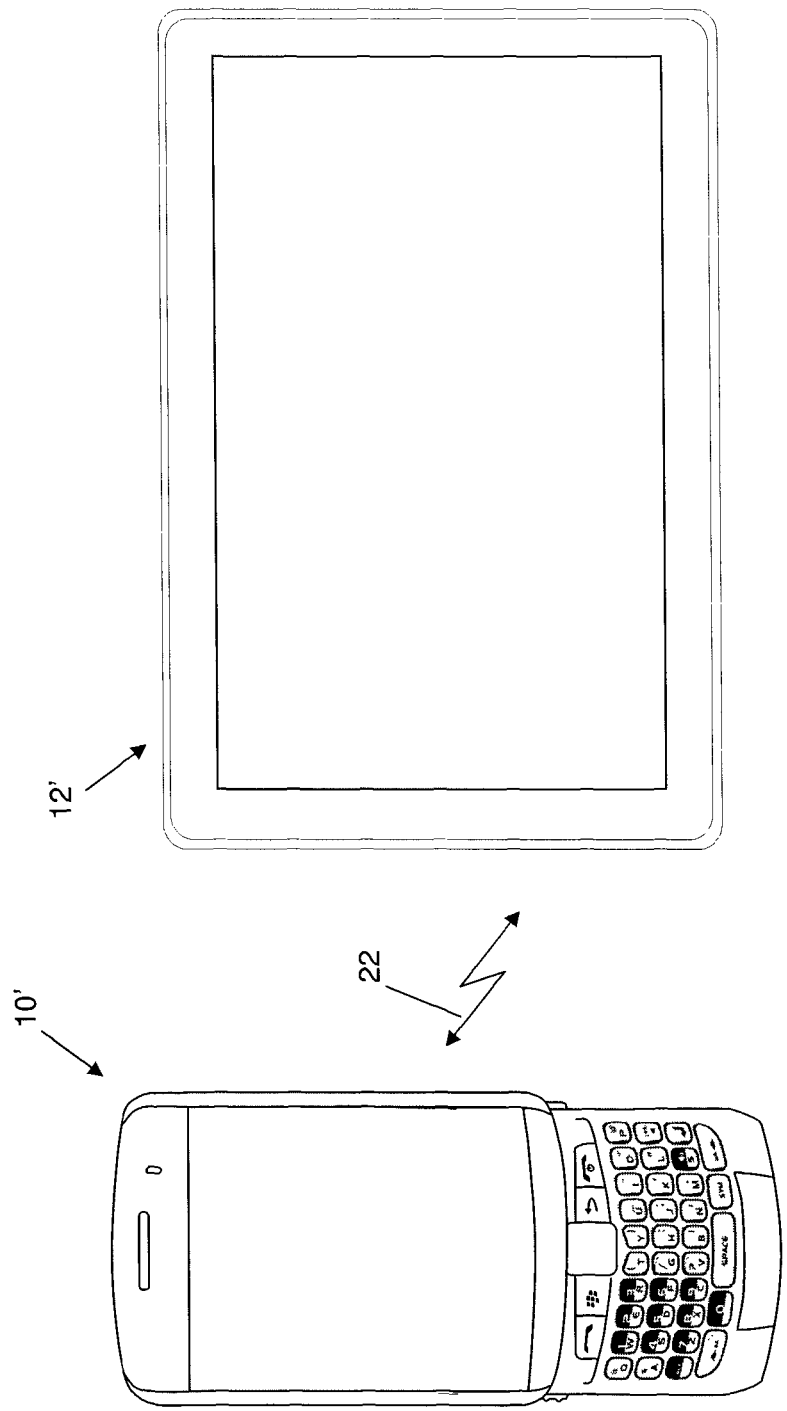
FIG. 3 is a pictorial view of a paired device and a polling device.

FIG. 3 illustrates an example of a pair of tethered devices that may be operated by the same user and wherein one of the tethered devices may act as the paired device 10 or the polling device 12 depending on the state of charge of the battery of that device or according to the connectivity parameters of that device. In FIG. 3, a smart phone paired device 10' is shown wirelessly tethered to a tablet computer polling device 12'. In the example shown in FIG. 3, assuming the table computer 12' includes a larger battery, the tablet computer 12' can be used to poll the network service 14 for the smart phone 10' in order to conserve the battery power of the smart phone 10'. Additionally, the tablet computer 12' may be configured to access a network access point 20 and may have a more powerful processor than the smart phone 10' thus enabling the tablet computer 12' to offload processing burden from the smart phone 10' when the smart phone 10' is communicable with the tablet computer 12'.

Figure 4:
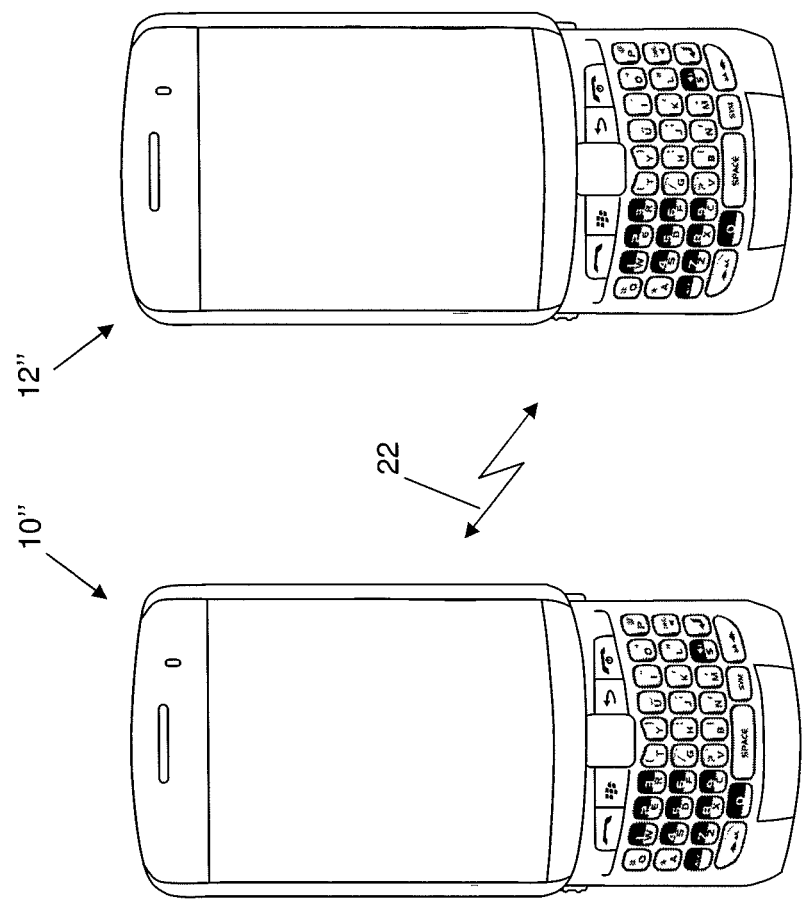
FIG. 4 is a pictorial view of a paired device and a polling device.

FIG. 4 illustrates an example of a pair of wirelessly tethered devices that may be operated by different users. For example, multiple smart phones within the same household could act as either a paired device 10 or a polling device 12 depending on the relative battery lives and/or connectivity parameters of the devices 10, 12. In the example shown in FIG. 4, a first smart phone paired device 10" communicates with a second smart phone polling device 12" to have the second smart phone polling device 12" poll the network service 14. The connectivity illustrated in FIG. 4 enables one user to benefit from a connection with another user's device in order to enable the one user's device to remain in a low power state for longer than it otherwise would when periodic polling of the network service 14 is to be performed.

Figure 5:
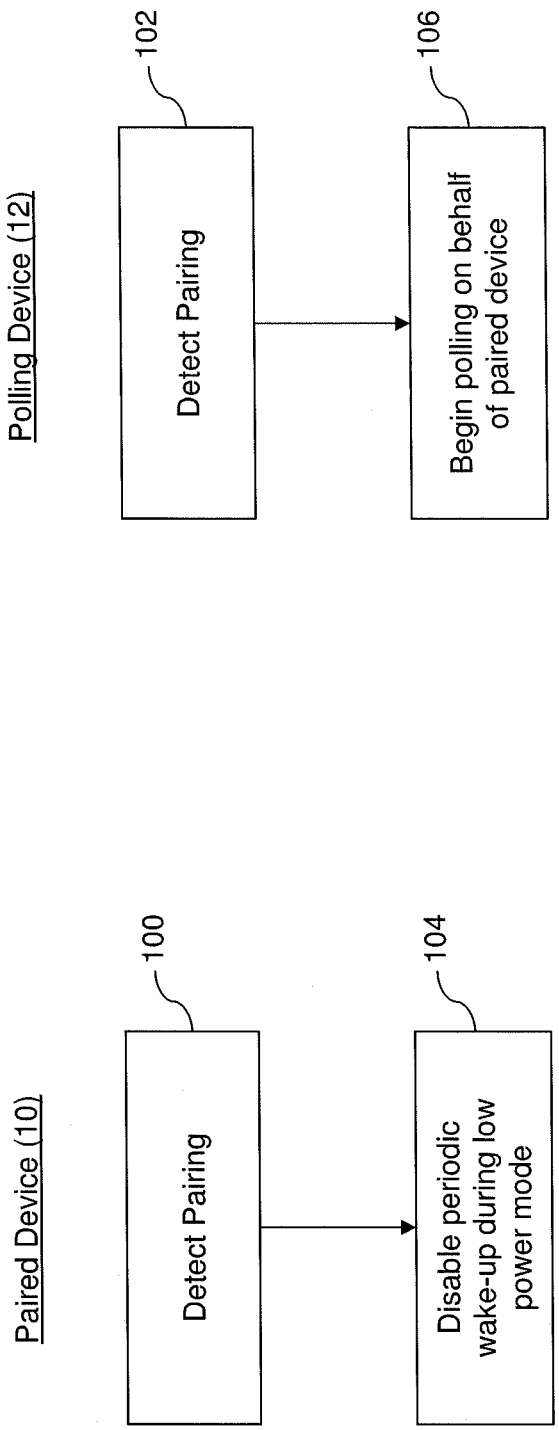
FIG. 5 is a flow chart illustrating example computer executable instructions that may be performed in having a polling device poll a network service on behalf of a paired device.

As illustrated in FIG. 5, after detecting a pairing with a polling device 12, at 100, the paired device 10 may disable a periodic wake-up during a low power mode, at 104. The polling device 12, after detecting the pairing, at 102, may then begin polling the corresponding network service 14, at 106, on behalf of the paired device 10. The pairing detected at 100 and 102 may be a routine pairing between the paired device 10 and the polling device 12, e.g., during the course of a user tethering two devices together, or may be initiated specifically to initiate the polling, at 106. For example, the paired device 10 may detect an entrance into a low power state at which time a pairing with the polling device 12 is initiated.

Figure 6:
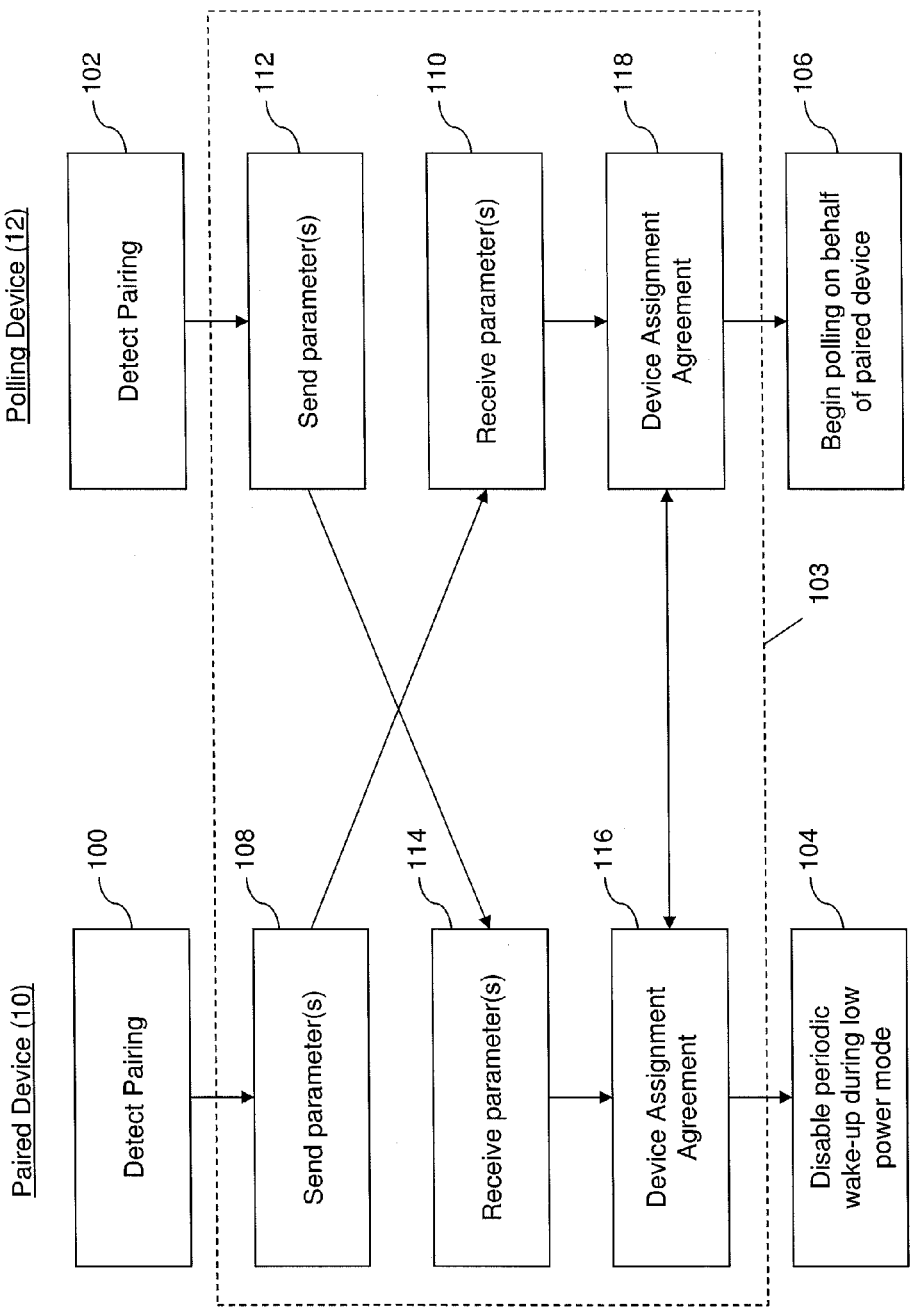
FIG. 6 is a flow chart illustrating example computer executable instructions that may be performed in establishing paired and polling device assignments.

Whether a particular device is to act as the paired device 10 or the polling device 12 may depend on various parameters of one or both of potential paired devices or may be prearranged. For example, in a tethering configuration such as that shown in FIG. 3, the smart phone 10' may by default act as a paired device 10' whenever the smart phone 10' is tethered to the tablet computer 12'. Conversely, two devices that are capable of being paired may determine which device is more appropriate as the paired device 10' than the polling device 12', e.g., based on connectivity to the network service 14, relative battery power, etc. FIG. 6 illustrates the addition of a provisioning stage 103 to the operations illustrated in FIG. 5.

Turning now to FIG. 6, after detecting a pairing with the "to-be" polling device 12, the to-be paired device 10 may send one or more parameters to the to-be polling device 12, at 108, which are received by the to-be polling device 12, at 110. Similarly, after detecting a pairing with the to-be paired device 10, the to-be polling device 12 may send one or more parameters to the to-be paired device 10, at 112, which are received by the to-be paired device 10, at 114. By exchanging parameters, at 108-114, the to-be paired device 10 and the to-be polling device 12 can determine which device is more suitable as the polling device 12. In the example shown in FIG. 6, the devices 10, 12 participate in a device assignment agreement, at 116 and 118, to establish the paired and polling assignments for continuing to operate, at 104 and 106. The one or more parameters exchanged, at 108-114, may include, for example, a relative battery power (e.g., percentage of a complete charge), a connection capability (e.g., wireless versus wired), etc. Referencing more than one parameter enables the devices 10, 12 to choose a most appropriate device assignment given the current environment. For example, even if one device currently has a lower battery level than the other device, if the one device includes a more favorable connection to the network service 14 (e.g., Wi-Fi instead of a cellular connection via the wireless network 18), the device with the lower battery level may be the more appropriate polling device 12. It can be appreciated that various thresholds and other criteria may be considered. For example, the above scenario may proceed unless the device having the more favorable connection to the network service 14 has a battery level lower than a predetermined threshold such as 10%.

Figure 7:
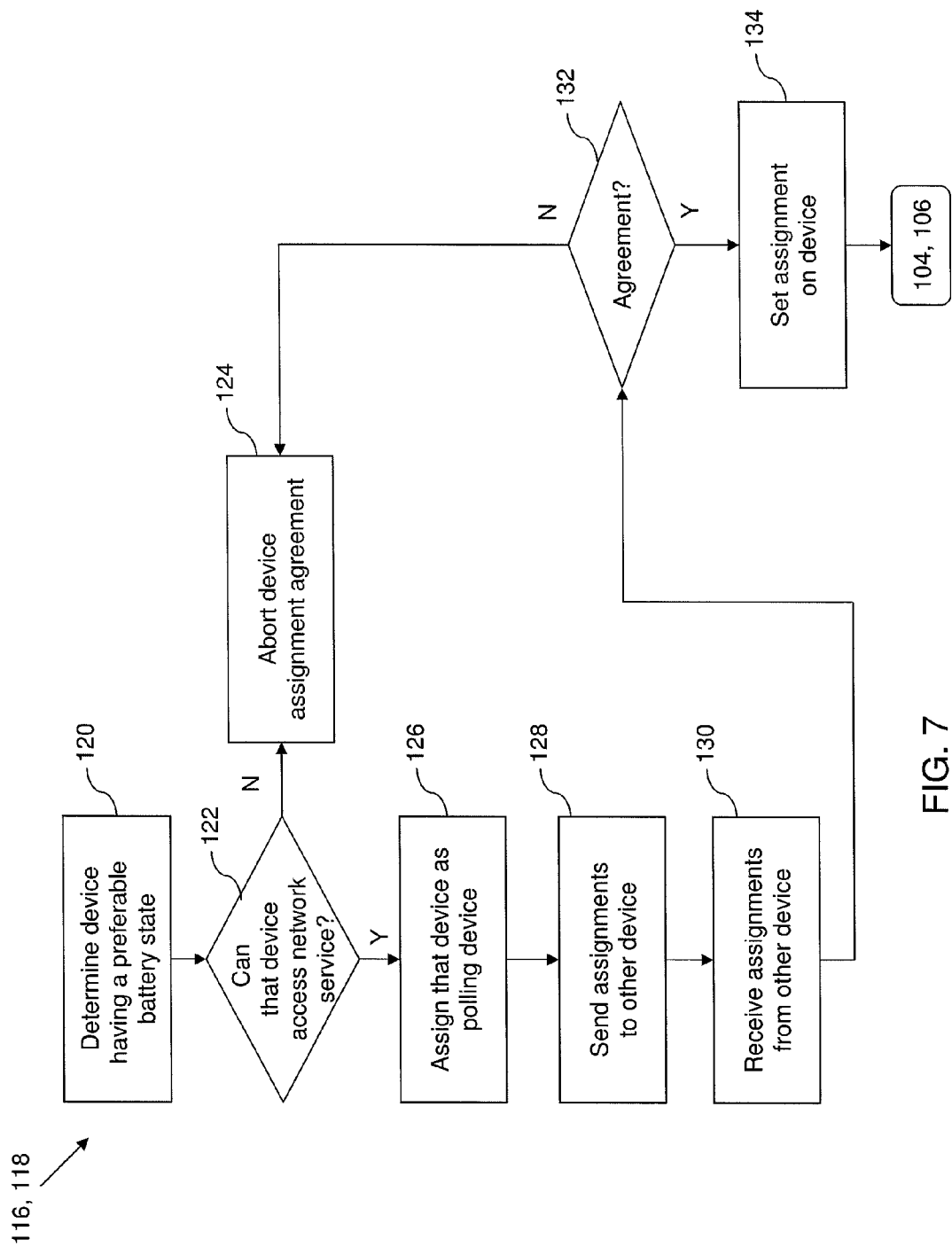
FIG. 7 is a flow chart illustrating example computer executable instructions that may be performed in conducting a device assignment agreement between candidate paired and polling devices.

FIG. 7 illustrates an example of a set of operations that may be performed by either or both devices in the pairing to establish a device assignment agreement, at 116 or 118. At 120, the polling module 46, 54 determines which device in the pairing has a preferable battery state, e.g., which device has a higher percentage of battery life remaining. The polling module 46, 54 then determines, at 122, whether or not the device having the preferable battery state can access the network service 14. If not, the device assignment agreement may be aborted, at 124. If the device having the preferable battery state can access the network service 14, that device is provisionally assigned as the polling device 12, at 126. The polling module 46, 54 then sends its provisional determination, at 128, to the other device in the pairing and receives a provisional determination from the other device, at 130. The polling module 46, 54 then determines, at 132, whether or not there is an agreement between the provisional determinations made by the respective devices. If not, the device assignment agreement may be aborted, at 124. If the provisional determinations made by the paired devices are in agreement, the respective device assignments are set, at 134, in order to have the respective device operate as the paired device 10 or the polling device 12 and proceed to operation 104 or 106.

The operations shown in FIG. 7 may also include a determination of which device in the pairing has a preferable network connectivity capability. For example, operation 120 may include determining an overall preferable state based on both battery state and network connection options. For example, the polling module 46, 54 may determine whether or not the device with a preferred battery state has a prohibitive network connection. For example, the device with the preferable battery state may only be connectable to the network service 14 via a wireless network 18 having charges associated with such access whereas the device having a less preferable battery state may have access to a Wi-Fi connection. In such an example, the polling module 46, 54 may first determine whether or not both devices can access the network and proceed with determining a preferable device only when both devices can connect to the network service 14. It can be appreciated that if one of the devices in the pairing cannot access the network service 14, that device may be automatically assigned as the paired device 10 to enable the polling device 12 to provide tethered connectivity to the network service 14 for the paired device 10.

It can also be appreciated that although the example shown in FIGS. 6 and 7 includes a sharing of proposed assignments from each of the paired devices, in other examples, one of the devices may be assigned to perform a device assignment designation without requiring an agreement between the devices.

Figure 8:
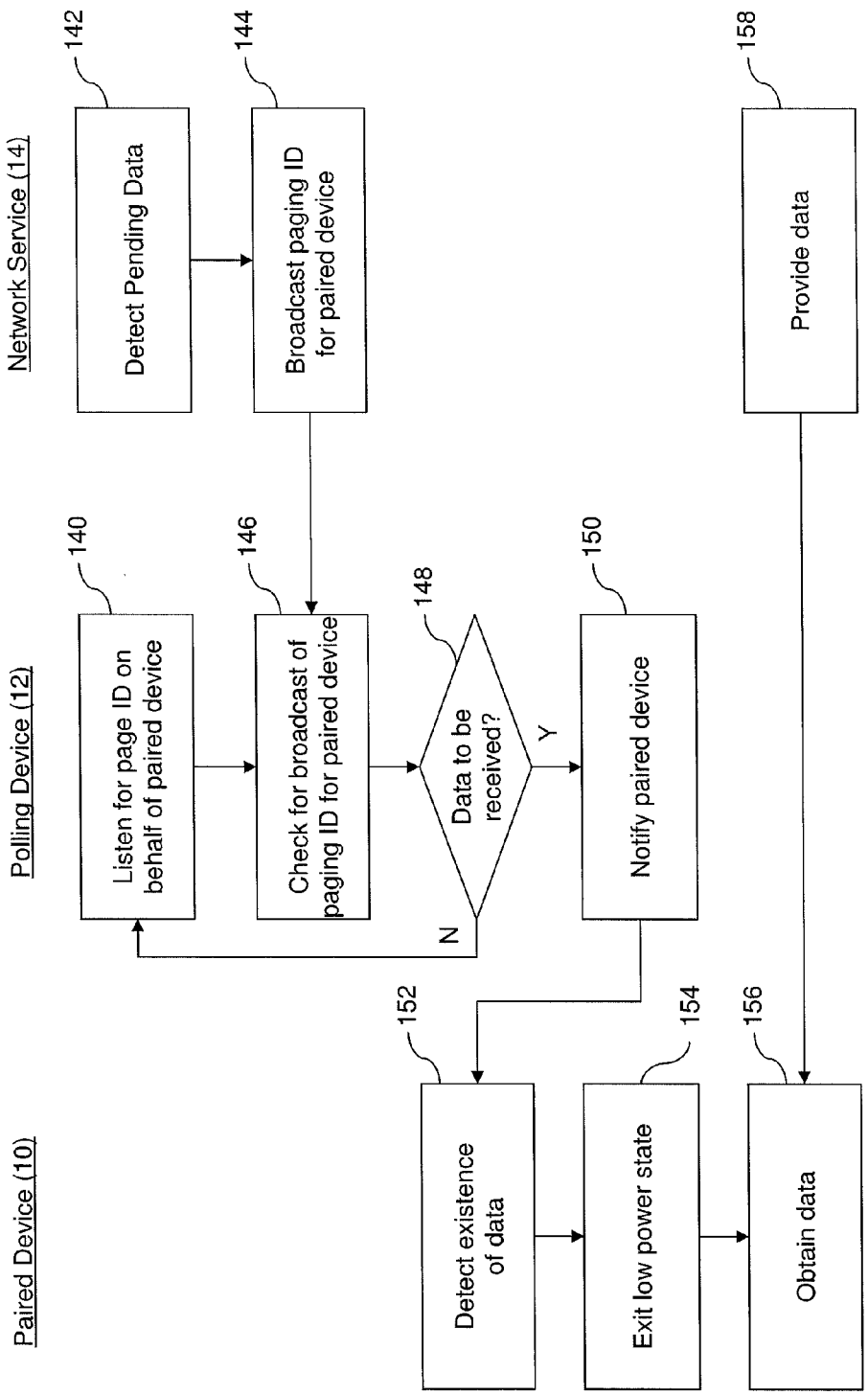
FIG. 8 is a flow chart illustrating example computer executable instructions that may be performed in a polling device polling a network service on behalf of a paired device.

FIG. 8 illustrates an example of a set of operations that may be performed in having the polling device 12 operate on behalf of the paired device 10. At 140, the polling device 12 polls the network service 14 on behalf of the paired device 10 by listening 24 for a paging ID 26. In the example shown, the network service 14 detects pending data 30, at 142, and broadcasts a paging ID 26, at 144, which indicates that the pending data 30 exists for the paired device 10. The paging ID 26 is detected by the polling device 12, at 146, and the polling device 12 determines, at 148, whether or not there exists data 30 to be received by the paired device 10. If not, the periodic polling may repeat, at 140. If data 30 does exist for the paired device 10 (as shown in FIG. 8), the polling device 12 then notifies the paired device 10 of the data 30, at 150, e.g., by sending a wake-up message 28. The paired device 10 then detects the existence of the data 30, at 152, and exits a low power state, at 154, such that the paired device 10 can obtain the data 30, at 156, the data 30 having been provided by the network service 14 to the paired device 10, e.g., via the wireless network 18.

Figure 9:
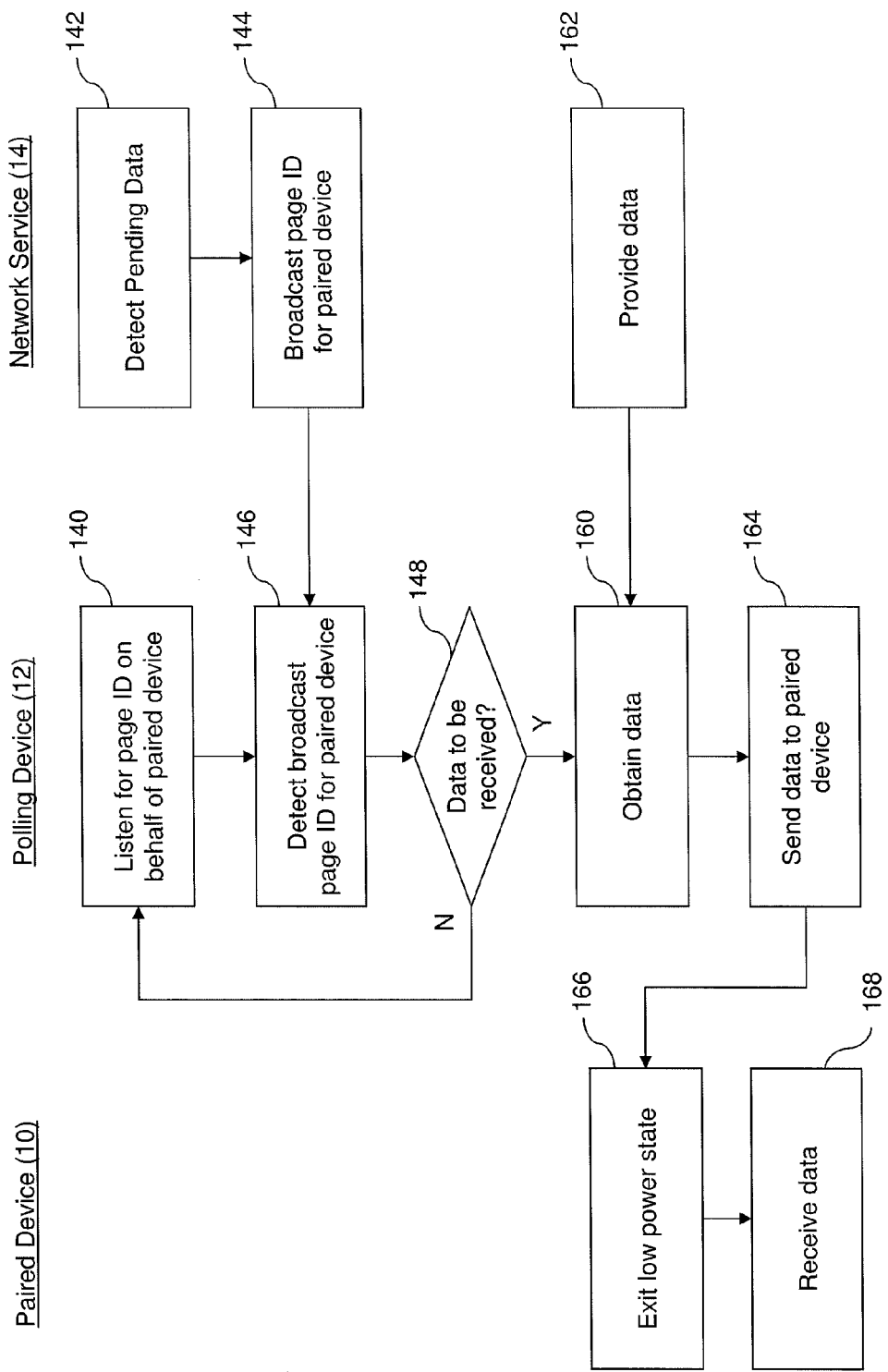
FIG. 9 is a flow chart illustrating example computer executable instructions that may be performed in a polling device polling a network service on behalf of a paired device.

As discussed above, the polling device 12 may also obtain the data 30 from the network service 14 on behalf of the paired device 10 and provide the data 30 to the paired device 10 via the wireless short-range connection 22 (or other connection such as wired connection 23). FIG. 9 illustrates an example of a set of operations that may be performed in having the polling device 12 operate on behalf of the paired device 10 in such a scenario. As can be appreciated from FIG. 9, operations 140 to 148 in FIG. 9 are similar to those shown in FIG. 8 and described above and thus details thereof need not be reiterated. In the example shown in FIG. 9, if the polling device 12 determines, at 148, that data 30 is to be received, rather than have the paired device 10 receive the data 30 directly from the network service 14, the polling device 12 in this example obtains the data, at 160, which has been provided by the network service 14, at 162. The data 30 is then sent by the polling device 12 to the paired device 10, at 164 and the paired device 10 exits its low power state, at 166, and receives the data 30, at 168. In this way, the paired device 10 may receive data 30 via an alternative channel and remain in a low power state for a maximum amount of time, thus conserving a maximum amount of battery power.

As illustrated in FIGS. 8 and 9, the polling modules 46, 54 enable the paired device 10 and polling device 12 to both conserve battery power for the paired device 10 and allow the paired device 10 to remain in a low power state for longer periods of time while maintaining connectivity with a network service 14.

Figure 10:
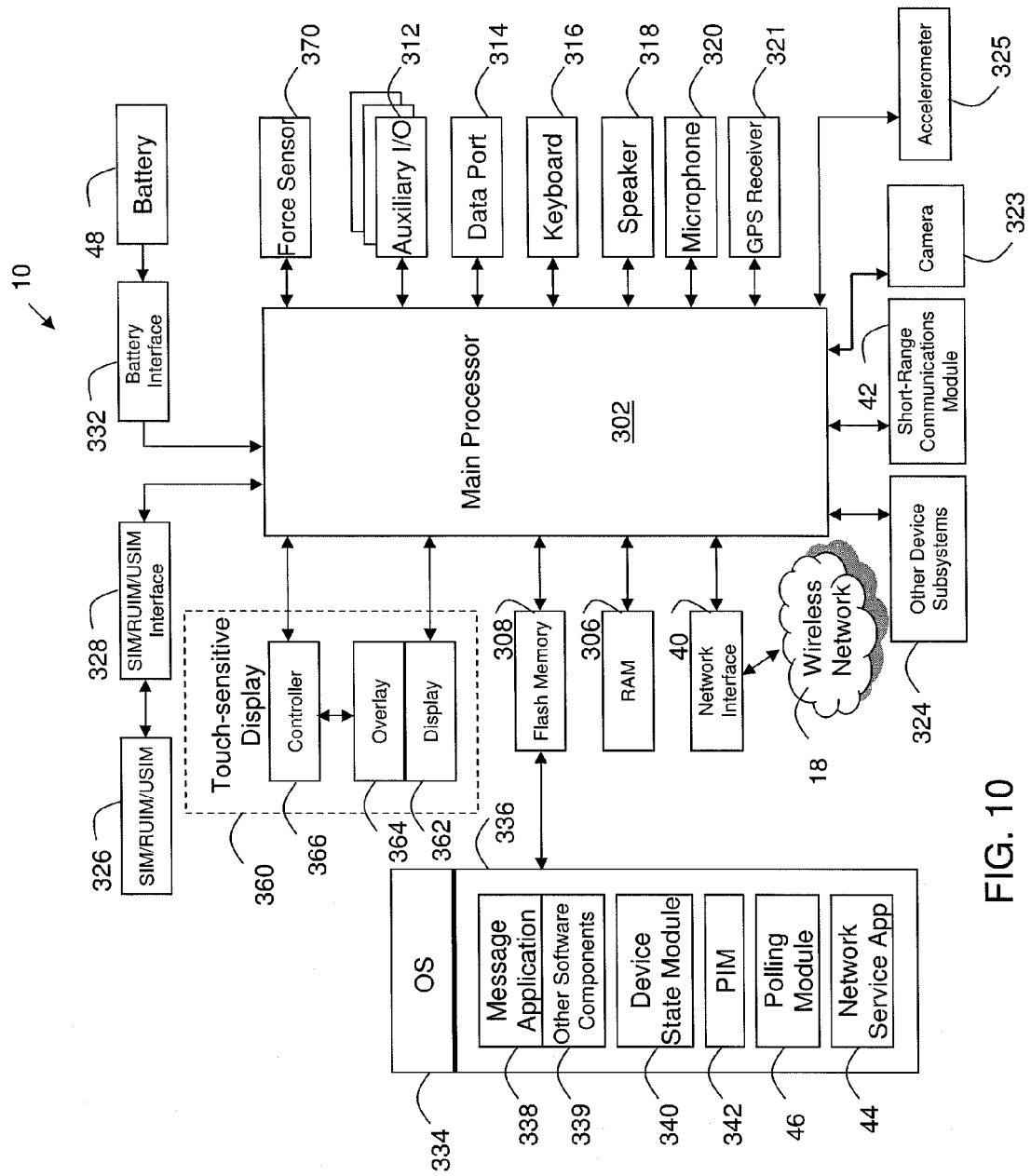
FIG. 10 is a block diagram illustrating an example configuration for a mobile device.

Referring to FIG. 10, to further aid in the understanding of the example paired and polling devices 10, 12 described above, shown therein is a block diagram of an example configuration of a paired device 10, which is a mobile device 10. It can be appreciated that the same configuration may apply to the polling device 12 in at least some examples. The mobile device 10 includes a number of components such as a main processor 302 that controls the overall operation of the mobile device 10. Communication functions, including data and voice communications, are performed through a network interface 40. The network interface 40 receives messages from and sends messages to a wireless network 18. In this example of the mobile device 10, the network interface 40 is configured in accordance with the GSM and General Packet Radio Services (GPRS) standards, which are used worldwide. Other communication configurations that are equally applicable are the 3G and 4G networks such as Enhanced Data-rates for Global Evolution (EDGE), Universal Mobile Telecommunications System (UMTS) and High-Speed Downlink Packet Access (HSDPA), Long Term Evolution (LTE), Worldwide Interoperability for Microwave Access (Wi-Max), etc. New standards are still being defined, but it is believed that they will have similarities to the network behavior described herein, and it will also be understood by persons skilled in the art that the examples described herein are intended to use any other suitable standards that are developed in the future. The wireless link connecting the network interface 40 with the wireless network 18 represents one or more different Radio Frequency (RF) channels, operating according to defined protocols specified for GSM/GPRS communications.

The main processor 302 also interacts with additional subsystems such as a Random Access Memory (RAM) 306, a flash memory 308, a touch-sensitive display 360, an auxiliary input/output (I/O) subsystem 312, a data port 314, a keyboard 316 (physical, virtual, or both), a speaker 318, a microphone 320, a GPS receiver 321, short-range communications module 42, a camera 323, an accelerometer 325 and other device subsystems 324. Some of the subsystems of the mobile device 10 perform communication-related functions, whereas other subsystems may provide "resident" or on-device functions. By way of example, the display 360 and the keyboard 316 may be used for both communication-related functions, such as entering a text message for transmission over the wireless network 18, and device-resident functions such as a calculator or task list. In one example, the mobile device 10 can include a non touch-sensitive display in place of, or in addition to the touch-sensitive display 360. For example the touch-sensitive display 360 can be replaced by a display 362 that may not have touch-sensitive capabilities.

The mobile device 10 can send and receive communication signals over the wireless network 18 after required network registration or activation procedures have been completed. Network access is associated with a subscriber or user of the mobile device 10. To identify a subscriber, the mobile device 10 may use a subscriber module component or "smart card" 326, such as a SIM, a Removable User Identity Module (RUIM) and a Universal Subscriber Identity Module (USIM). In the example shown, a SIM/RUIM/USIM 326 is to be inserted into a SIM/RUIM/USIM interface 328 in order to communicate with a network.

The mobile device 10 is typically a battery-powered device and includes a battery interface 332 for receiving one or more rechargeable batteries 48. In at least some examples, the battery 48 can be a smart battery with an embedded microprocessor. The battery interface 332 is coupled to a regulator (not shown), which assists the battery 48 in providing power to the mobile device 10. Although current technology makes use of a battery, future technologies such as micro fuel cells may provide the power to the mobile device 10.

The mobile device 10 also includes an operating system 334 and software components 336 to 342, 44, and 46. The operating system 334 and the software components 336 to 342, 44, and 46 that are executed by the main processor 302 are typically stored in a persistent store such as the flash memory 308, which may alternatively be a read-only memory (ROM) or similar storage element (not shown). Those skilled in the art will appreciate that portions of the operating system 334 and the software components 336 to 342, 44, and 46 such as specific device applications, or parts thereof, may be temporarily loaded into a volatile store such as the RAM 306. Other software components can also be included, as is well known to those skilled in the art.

The subset of software applications 336 that control basic device operations, including data and voice communication applications, may be installed on the mobile device 10 during its manufacture. Software applications may include a message application 338, a device state module 340, a Personal Information Manager (PIM) 342, a polling module 46, and a network service application 44. A message application 338 can be any suitable software program that allows a user of the mobile device 10 to send and receive electronic messages, wherein messages are typically stored in the flash memory 308 of the mobile device 10. A device state module 340 provides persistence, i.e. the device state module 340 ensures that important device data is stored in persistent memory, such as the flash memory 308, so that the data is not lost when the mobile device 10 is turned off or loses power. A PIM 342 includes functionality for organizing and managing data items of interest to the user, such as, but not limited to, e-mail, contacts, calendar events, and voice mails, and may interact with the wireless network 18.

Other types of software applications or components 339 can also be installed on the mobile device 10. These software applications 339 can be pre-installed applications (i.e. other than message application 338) or third party applications, which are added after the manufacture of the mobile device 10. Examples of third party applications include games, calculators, utilities, etc.

The additional applications 339 can be loaded onto the mobile device 10 through at least one of the wireless network 18, the auxiliary I/O subsystem 312, the data port 314, the short-range communications module 42, or any other suitable device subsystem 324.

The data port 314 can be any suitable port that enables data communication between the mobile device 10 and another computing device. The data port 314 can be a serial or a parallel port. In some instances, the data port 314 can be a USB port that includes data lines for data transfer and a supply line that can provide a charging current to charge the battery 330 of the mobile device 10.

For voice communications, received signals are output to the speaker 318, and signals for transmission are generated by the microphone 320. Although voice or audio signal output is accomplished primarily through the speaker 318, the display 362 can also be used to provide additional information such as the identity of a calling party, duration of a voice call, or other voice call related information.

The touch-sensitive display 360 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. In the presently described example, the touch-sensitive display 360 is a capacitive touch-sensitive display which includes a capacitive touch-sensitive overlay 364. The overlay 364 may be an assembly of multiple layers in a stack which may include, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

The display 362 of the touch-sensitive display 360 may include a display area in which information may be displayed, and a non-display area extending around the periphery of the display area. Information is not displayed in the non-display area, which is utilized to accommodate, for example, electronic traces or electrical connections, adhesives or other sealants, and/or protective coatings around the edges of the display area.

In some examples, an optional force sensor 370 or force sensors is disposed in any suitable location, for example, between the touch-sensitive display 360 and a back of the mobile device 10 to detect a force imparted by a touch on the touch-sensitive display 360. The force sensor 370 may be a force-sensitive resistor, strain gauge, piezoelectric or piezoresistive device, pressure sensor, or other suitable device. Force as utilized throughout the specification refers to force measurements, estimates, and/or calculations, such as pressure, deformation, stress, strain, force density, force-area relationships, thrust, torque, and other effects that include force or related quantities.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the mobile device 10, any component of or related thereto, etc., or accessible or connectable thereto. Any application or module herein described may be implemented using computer readable/executable instructions that may be stored or otherwise held by such computer readable media.

Accordingly, there is provided a method of operating a mobile device, the method comprising: pairing the mobile device with a second device; having the second device poll a network service on behalf of the mobile device; and obtaining data provided by the network service.

There is also provided a computer readable storage medium comprising computer executable instructions for operating a mobile device, the computer executable instructions comprising instructions for: pairing the mobile device with a second device; having the second device poll a network service on behalf of the mobile device; and obtaining data provided by the network service.

There is also provided a mobile device comprising a processor and memory, the memory comprising computer executable instructions for operating the mobile device, the computer executable instructions comprising instructions for: pairing the mobile device with a second device; having the second device poll a network service on behalf of the mobile device; and obtaining data provided by the network service.

There is also provided a method of operating on behalf of a mobile device, the method comprising: pairing a second device with the mobile device; polling a network service on behalf of the mobile device; and enabling data provided by the network service to be sent to the mobile device.

There is also provided a computer readable storage medium comprising computer executable instructions for operating on behalf of a mobile device, the computer executable instructions comprising instructions for: pairing a second device with the mobile device; polling a network service on behalf of the mobile device; and enabling data provided by the network service to be sent to the mobile device.

There is also provided an electronic device comprising a processor and memory, the memory comprising computer executable instructions for operating on behalf of a mobile device, the computer executable instructions comprising instructions for: pairing the electronic device with the mobile device; polling a network service on behalf of the mobile device; and enabling data provided by the network service to be sent to the mobile device.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A method of operating a first client device, the method comprising:
   pairing the first client device with a second client device;
   exchanging at least one parameter of the first client device with the second client device, the at least one parameter comprising a connection type for a respective device indicating which of a plurality of connection types is available to the respective device for connecting to a network service, and a relative battery level for the respective device;
considering both the connection types available to access the network service and the relative battery level of the first and second client devices, and selecting the second client device to access the network service based on the connection type, despite having a relatively lower battery level than the first mobile device;
having the second client device poll the network service on behalf of the first client device and disabling a periodic wake up on the first client device during a low power state; and
exiting the first client device from the low power state and obtaining data provided by the network service after the second client device determines the existence of the data provided by the network service for the first client device.

2. The method of claim 1, wherein the data is provided to the first client device by the network service, the method further comprising receiving a message from the second client device to exit the low power state.

3. The method of claim 2, the first client device receiving the message via a short-range communications connection.

4. The method of claim 1, wherein the data is provided to the first client device by the second client device.

5. The method of claim 4, wherein the data is received by the first client device via a short-range communications connection.

6. The method of claim 1, the first client device pairing with the second client device after detecting initiation of the low power state.

7. A method of operating on behalf of a first client device, the method comprising:
pairing a second client device with the first client device;
exchanging at least one parameter of the second client device with the first client device, the at least one parameter comprising a connection type for a respective device indicating which of a plurality of connection types is available to the respective device for connecting to a network service, and a relative battery level for the respective device;
considering both the connection types available to access the network service and the relative battery level of the first and second client devices, and selecting the second client device to access the network service based on the connection type, despite having a relatively lower battery level than the first mobile device;
polling the network service on behalf of the first client device during a low power state of the first client device to enable the first client device to disable a periodic wake up during the lower power state; and
having the first client device exit the low power state by enabling data provided by the network service to be sent to the first client device after the second client device determines the existence of the data provided by the network service for the first client device.

8. The method of claim 7, wherein the data is provided to the first client device by the network service, the method further comprising sending a message to the first client device to exit the low power state.

9. The method of claim 7, wherein the data is provided to the first client device by the second client device.

10. The method of claim 7, the second client device pairing with the first client device after the first client device has detected initiation of the low power state.

11. The method of claim 7, the second client device pairing with the first client device via a short-range communications connection.

12. The method of claim 7, the second client device polling the network service by listening for a paging identifier associated with the first client device.

13. A non-transitory computer readable storage medium comprising computer executable instructions for operating a first client device, the computer executable instructions comprising instructions for:
pairing the first client device with a second client device;
exchanging at least one parameter of the first client device with the second client device, the at least one parameter comprising a connection type for a respective device indicating which of a plurality of connection types is available to the respective device for connecting to a network service, and a relative battery level for the respective device;
considering both the connection types available to access the network service and the relative battery level of the first and second client devices, and selecting the second client device to access the network service based on the connection type, despite having a relatively lower battery level than the first mobile device;
having the second client device poll the network service on behalf of the first client device and disabling a periodic wake up on the first client device during a low power state; and
exiting the first client device from the low power state and obtaining data provided by the network service after the second client device determines the existence of the data provided by the network service for the first client device.

14. A first client device comprising a processor and memory, the memory comprising computer executable instructions for operating the first client device, the computer executable instructions comprising instructions for:
pairing the first client device with a second client device;
exchanging at least one parameter of the first client device with the second client device, the at least one parameter comprising a connection type for a respective device indicating which of a plurality of connection types is available to the respective device for connecting to a network service, and a relative battery level for the respective device;
considering both the connection types available to access the network service and the relative battery level of the first and second client devices, and selecting the second client device to access the network service based on the connection type, despite having a relatively lower battery level than the first mobile device;
having the second client device poll the network service on behalf of the first client device and disabling a periodic wake up on the first client device during a low power state; and
exiting the first client device from the low power state and obtaining data provided by the network service after the second client device determines the existence of the data provided by the network service for the first client device.

15. A non-transitory computer readable storage medium comprising computer executable instructions for operating on behalf of a first client device, the computer executable instructions comprising instructions for:
pairing a second client device with the first client device;
exchanging at least one parameter of the second client device with the first client device, the at least one parameter comprising a connection type for a respective device indicating which of a plurality of connection types is available to the respective device for connecting to a network service, and a relative battery level for the respective device;

considering both the connection types available to access the network service and the relative battery level of the first and second client devices, and selecting the second client device to access the network service based on the connection type, despite having a relatively lower battery level than the first mobile device;

polling the network service on behalf of the first client device during a low power state of the first client device to enable the first client device to disable a periodic wake up during the lower power state; and having the first client device exit the low power state by enabling data provided by the network service to be sent to the first client device after the second client device determines the existence of the data provided by the network service for the first client device.

16. A second client device comprising a processor and memory, the memory comprising computer executable instructions for operating on behalf of a first client device, the computer executable instructions comprising instructions for:

pairing the second client device with the first client device;

exchanging at least one parameter of the second client device with the first client device, the at least one parameter comprising a connection type for a respective device indicating which of a plurality of connection types is available to the respective device for connecting to a network service, and a relative battery level for the respective device;

considering both the connection types available to access the network service and the relative battery level of the first and second client devices, and selecting the second client device to access the network service based on the connection type, despite having a relatively lower battery level than the first mobile device;

polling the network service on behalf of the first client device during a low power state of the first client device to enable the first client device to disable a periodic wake up during the lower power state; and having the first client device exit the low power state by enabling data provided by the network service to be sent to the first client device after the second client device determines the existence of the data provided by the network service for the first client device.

17. The method of claim 1, wherein the first client device is chosen to access the network service when the battery level of the second client device is below a predetermined threshold.

18. The non-transitory computer readable medium of claim 13, wherein the first client device is chosen to access the network service when the battery level of the second client device is below a predetermined threshold.

19. The non-transitory computer readable medium of claim 15, wherein the first client device is chosen to access the network service when the battery level of the second client device is below a predetermined threshold.

* * * * *